(12) United States Patent
Blot et al.

(10) Patent No.: US 9,199,395 B2
(45) Date of Patent: Dec. 1, 2015

(54) MOLD ADAPTED TO RECEIVE A PREFORM OF A COMPOSITE PART AND CORRESPONDING MOLDING METHOD

(71) Applicant: AIRBUS OPERATIONS (SAS), Toulouse (FR)

(72) Inventors: Philippe Blot, Nantes (FR); Sebastien Gohier, La Montagne (FR); Gilles Bezard, Pornichet (FR); Matthieu Kneveler, Reze (FR)

(73) Assignee: Airbus Operations (S.A.S.), Toulouse (FR)

( * ) Notice: Subject to any disclaimer, the term of this patent is extended or adjusted under 35 U.S.C. 154(b) by 257 days.

(21) Appl. No.: 13/682,335

(22) Filed: Nov. 20, 2012

(65) Prior Publication Data

US 2013/0285283 A1 Oct. 31, 2013

Related U.S. Application Data

(63) Continuation of application No. PCT/FR2011/051164, filed on May 23, 2011.

(30) Foreign Application Priority Data

May 25, 2010 (FR) ...................................... 10 54039

(51) Int. Cl.
*B29C 33/76* (2006.01)
*B29C 45/26* (2006.01)
(Continued)

(52) U.S. Cl.
CPC .............. *B29C 45/0005* (2013.01); *B29C 33/12* (2013.01); *B29C 33/30* (2013.01); *B29C 33/44* (2013.01); *B29C 70/48* (2013.01); *B29C 70/443* (2013.01); *B29C 70/543* (2013.01); *Y02T 50/433* (2013.01)

(58) Field of Classification Search
CPC .... B29C 45/0005; B29C 33/44; B29C 70/48; B29C 33/12; B29C 33/30
See application file for complete search history.

(56) References Cited

U.S. PATENT DOCUMENTS

| 795,518 | A | * | 7/1905 | Lamp | ............................ | 249/139 |
| 3,743,469 | A | * | 7/1973 | Gibbons | .................... | 425/451.2 |

(Continued)

FOREIGN PATENT DOCUMENTS

| DE | 10 2008 038620 | 12/2009 |
| EP | 2 050 553 | 4/2009 |
| FR | 1 308 574 | 11/1962 |

OTHER PUBLICATIONS

International Search Report for Application No. PCT/FR2011/051164 dated Jul. 22, 2011.

*Primary Examiner* — Matthew Daniels
(74) *Attorney, Agent, or Firm* — Jenkins, Wilson, Taylor & Hunt, P.A.

(57) ABSTRACT

A mold including: a central core having a side wall with a plane external surface; an internal mold element having an internal surface facing the external surface of the central core, with surfaces inclined to the vertical in order to form an angle of clearance, and a substantially vertical external surface; an external mold element fitted against the internal mold element and having a substantially vertical internal surface facing the external surface of the internal mold element; at least one of the facing surfaces being designed to receive a substantially vertical lateral preform so that the internal mold element and the external mold element are suitable for clamping said lateral preform.

5 Claims, 5 Drawing Sheets

(51) Int. Cl.
*B29C 70/44* (2006.01)
*B29C 45/00* (2006.01)
*B29C 33/12* (2006.01)
*B29C 33/30* (2006.01)
*B29C 33/44* (2006.01)
*B29C 70/48* (2006.01)
*B29C 70/54* (2006.01)

(56) References Cited

U.S. PATENT DOCUMENTS

| | | | |
|---|---|---|---|
| 4,620,958 A * | 11/1986 | Wiechard | 264/297.2 |
| 5,286,438 A | 2/1994 | Dublinski et al. | |
| 2007/0193183 A1* | 8/2007 | Price et al. | 52/596 |
| 2009/0159743 A1 | 6/2009 | Guering et al. | |
| 2011/0100542 A1 | 5/2011 | Faulkner et al. | |

* cited by examiner

MOLD ADAPTED TO RECEIVE A PREFORM OF A COMPOSITE PART AND CORRESPONDING MOLDING METHOD

CROSS-REFERENCE TO RELATED APPLICATION

This application is a continuation of and claims priority to PCT application No. PCT/FR2011/051164 filed May 23, 2011, which claims priority to French Patent Application No. 1054039 filed on May 25, 2010, the entire contents of which are both incorporated by reference herein.

TECHNICAL FIELD

The invention relates to a mold adapted to receive a preform of a composite part and in which said preform is adapted to be impregnated by injection of resin.

BACKGROUND

It is known that molding by injection of resin at low pressure (a process commonly called RTM) is a method for putting composites materials into form, in which a thermosetting resin is injected at low pressure, through a textile preform constituted by reinforcements and which is placed in a closed mold. According to this method, a preform is first of all draped which is placed in the mold, the mold is filled with resin, polymerization of the resin is carried out and the composite part obtained is removed from the mold.

This type of molding may present difficulties in particular in the case of molding by injection of a complex part, of large size and which has vertical lateral walls, such as an aircraft undercarriage bay.

In this type of part, the inside surfaces of the vertical lateral walls have regions of increased thickness for the stiffening of the part. Producing a corresponding preform is difficult to do directly in the mold, in particular for reliable production of the regions of increased thickness, the draping then being carried out blind.

When preforms are produced outside the mold then mounted in the mold, the putting in position of the preforms relative to each other (lateral preforms corresponding to the lateral walls of the part, upper preform, etc.) is difficult to ensure on account of the lower stiffness of those preforms before the injection of resin.

In both these cases, the removal from the mold of the part obtained is rendered complex due to the negative draft angles generated by the regions of increased thickness of the inside surfaces of the lateral walls.

SUMMARY

The invention is directed to improving a type of mold for producing parts by the RTM process, by providing a mold adapted to the production of complex parts and which is simple to use.

To that end the invention provides to a mold adapted to receive a preform for a part of composite material and in which said preform is adapted to be impregnated by injection of resin to form said part of composite material, said preform comprising at least one substantially vertical lateral preform, characterized in that said mold comprises:

a central core comprising at least one lateral wall which has an outside wall, which is for example planar;
an inside mold member having an inside surface turned towards said outside surface of the central core, with said surfaces being inclined relative to the vertical to form a draft angle, said inside mold member also having a substantially vertical outside surface;
an outside mold member mounted against said inside mold member and which has a substantially vertical inside surface, such that the inside surface of the outside mold member is turned towards the outside surface of the inside mold member; and
the inside surface of the outside mold member or the facing outside surface of the inside mold member being adapted to receive said lateral preform, such that the inside mold member and the outside mold member are adapted to clamp said lateral preform.

It will be noted that in the mold according to the invention, the lateral preform is clamped between two mold members mounted against the central core, such that reliable placing in position of the preform is ensured and that the holding in position of that preform during the injection is also ensured.

It will furthermore be noted that the two surfaces of the inside mold member are inclined to each other, with the substantially vertical outside surface and the inside surface forming a draft angle relative to the vertical, which makes it possible to mold a vertical wall with regions of increased thickness and to facilitate removal from the mold by virtue of the draft angle.

Furthermore, the design of the mold enables draping of the preform when flat, in optimized conditions.

According to other features, taken in isolation or in combination:

said outside surface of the inside mold member is adapted to receive a layer of material to form a sub-preform of the lateral preform.

a cavity is formed on the inside mold member, on the same side as the outside surface, such that said sub-preform is adapted to cover said cavity;

said inside surface of the outside mold member is adapted to receive a layer of material to form a second sub-preform of the lateral preform.

the inside mold member and the outside mold member are adapted to clamp the two sub-preforms the uniting of which forms the lateral preform when said mold members are mounted against each other;

the inside surface of the inside mold member bears grooves adapted to form, with the outside surface, flow channels for the resin, when the inside mold member is disposed against said outside surface;

cavities are formed on the outside mold member, on the same side as the inside surface, the sub-preform being adapted to cover the cavities;

the cavities extend in two different directions over the same inside surface of the outside mold member, such that the preform corresponding to the stiffening means associated with the lateral wall extends in two different directions over the same face of said lateral wall;

the central core comprises an upper wall adapted to receive a layer of material to form an upper preform connected to the lateral preform;

cavities are formed in the upper wall, such that a preform of the stiffeners is formed on a face when material is deposited on the upper wall; transverse portions adapted to receive a preform corresponding to upper frame portions are disposed on the upper wall, such that this upper frame portion preform is portion on the opposite side to the preform of the stiffeners relative to said upper disposed;

two lateral preforms are disposed on opposite sides of the central core, with spacers transversely linking the inside mold members associated with each lateral preform.

The invention also relates to a method of molding a part of composite material by injection of resin onto a preform of said part, said preform comprising at least one substantially vertical lateral preform, characterized in that it comprises the following steps:

disposing a mold member which has a first surface oriented upwardly;

disposing at least one layer of material forming a sub-preform on said first surface;

assembling said mold member with a second mold member, said first surface being turned towards said second mold member, such that said lateral preform formed by at least the sub-preform is clamped between the two mold members;

moving said mold members towards an mold for injection in which is disposed a central core comprising at least one lateral wall which has a planar outside surface;

positioning said mold members such that the lateral preform extends vertically and that the opposite surface to the first surface of the mold member is turned towards the planar outside surface of the central core, with said surfaces being inclined relative to the vertical to form a draft angle;

and injecting resin into the mold for molding the part.

Optionally, proceeding with the injection step, the preceding steps are reiterated to obtain a second lateral preform for the second lateral wall, then the two lateral preforms and the associated mold members are disposed on opposite sides of the central core in said mold for injection, respectively facing a lateral wall of said central core;

The invention also relates to a method for molding a part of composite material, in particular an aircraft undercarriage bay comprising at least one central wall, two vertical lateral walls and stiffening means, by injection of resin onto a preform of said part, characterized in that it comprises the following steps:

disposing an inside mold member which has an upwardly oriented outside surface, and which comprises a cavity on the same side as the outside surface;

disposing on said outside surface at least one layer of material forming a sub-preform corresponding to a vertical lateral wall;

disposing an outside mold member which has an upwardly oriented inside surface, and which comprises cavities on the same side as the inside surface;

disposing in said cavities of the inside surface at least one layer of material forming a sub-preform corresponding to said stiffening means;

assembling the two mold members, with said two surfaces turned towards each other, such that a lateral preform formed by uniting the two sub-preforms is clamped between the two mold members to form, after injection of the resin, a first lateral wall;

moving said lateral preform and said mold members towards a mold for injection in which is disposed a central core;

reiterating the preceding steps to obtain a second lateral preform for the second lateral wall;

disposing the two lateral preforms and the associated mold members on opposite sides of the central core in said mold for injection, respectively facing a lateral wall of said central core;

transversely connecting the inside mold members by spacers depositing on an upper wall of said central core, said upper wall linking the two lateral walls, at least one layer of material forming a sub-preform corresponding to the central wall, and injecting resin into the mold for molding the part.

According to other features, taken in isolation or in combination:

on the upper wall and between the lateral preforms and the associated mold members, transverse portions are mounted which are adapted to receive a preform corresponding to upper frame portions extending in a first direction;

the step of depositing the layer of material in the cavities of the inside surface of the outside mold member comprises a first deposit in said first direction and a second deposit in a perpendicular direction.

Furthermore, the invention also relates to a part of composite material obtained by one of the methods of molding by injecting resin as briefly set out above, the part being an aircraft undercarriage bay.

The invention also concerns an aircraft comprising at least one aircraft undercarriage bay obtained by one of the methods set out above.

BRIEF DESCRIPTION OF THE DRAWINGS

The disclosure of the invention will now be continued with the detailed description of an embodiment, given below by way of illustrative and non-limiting example, with reference to the accompanying drawings, in which.

DETAILED DESCRIPTION

Figure 1:
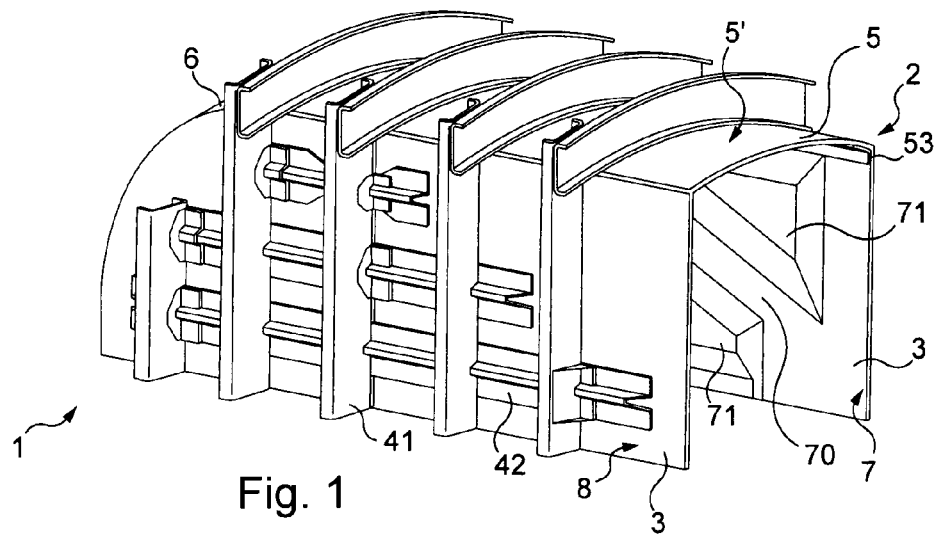
FIGS. 1 and 2 are perspective views of an aircraft undercarriage bay, from different angles.
Figure 2:
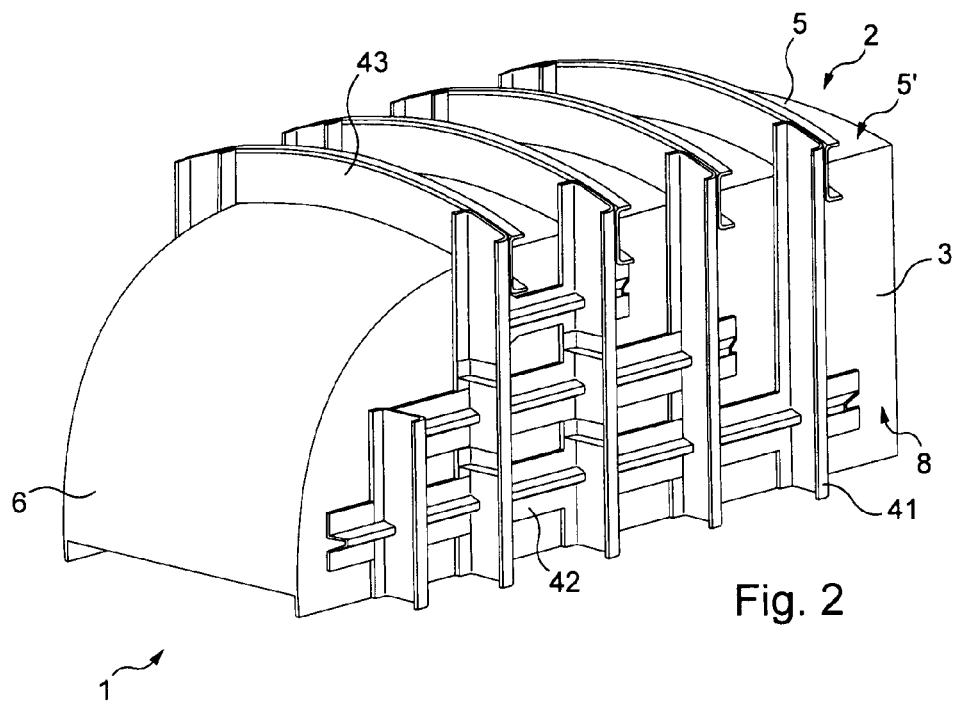

As illustrated in FIGS. 1 and 2, a undercarriage bay 1 which constitutes an example of a part of composite material comprises a central wall 2 extending longitudinally and to which two lateral walls 3 connect transversely. Each of the walls comprises stiffeners, here of Omega-section, and frame portions. I will be understood here that the portions of frame are stiffeners of larger size than the Omega-section stiffeners. The bay 1 has the shape of a shoe with a hollow inside forming a housing for a member of the undercarriage bay of an aircraft.

Viewed from the side, the central wall 2 is of parabolic shape, with a substantially horizontal upper portion 5, and a front face 6 of rounded shape which downwardly continues the front end edge of the upper portion 5 and which extends over substantially the whole height of the undercarriage bay 1.

Figure 4:
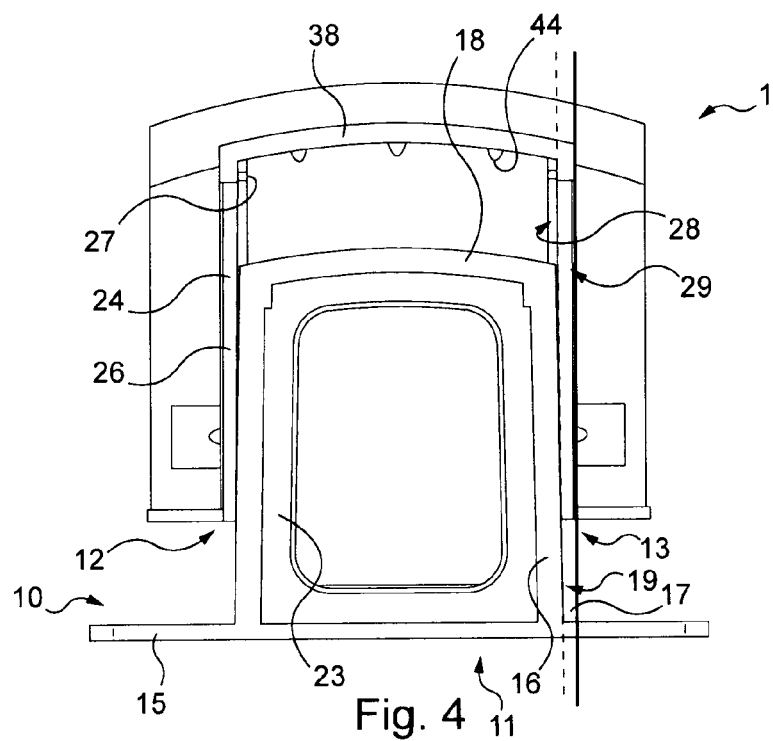
FIG. 4 is a rear view of the undercarriage bay and of the mold part represented in FIG. 3.

The upper portion 5 has an outside surface 5' adapted to receive frame upper portions 43, and an inside surface on which stiffeners 44 are integrally formed, which are visible in FIG. 4 and of which there are for example three here. It may be observed here that the stiffener forming means are disposed on opposite faces of the same wall. The upper portion 5 has a profile which is slightly dome-shaped in a transverse section plane, the center of portion 5 being higher than the sides.

The lateral walls 3 are vertical. They each have an inside surface 7 turned inwardly of the bay 1 and an outside surface 8 turned outwardly of the bay.

The lateral walls 3 comprise a skin of varying thickness, such that each inside surface 7 comprises regions of increased thickness 70. Here, the region of increased thickness extends from a corner of an inside surface 7 to an opposite corner, leaving regions of lower thickness 71 on opposite sides of the region of increased thickness 70, and making removal from the mold difficult on account of negative drift angles.

The outside surface 8 bears frame lateral portions 41, for example in the form of a beam of U-shaped cross-section, which are transversely arranged, and horizontal stiffeners 42 here for example of Omega-shaped cross-section, which extend between two successive frame lateral portions 41. It may be observed here that the stiffener forming means are disposed on the same face of a wall. The upper ends of the frame lateral portions 41 project beyond the upper portion 5.

The frame upper portions 43, transversely arranged, which are carried by the outside surface 5', are joined to the upper ends of the frame lateral portions 41.

The two lateral walls 3 and the central wall 2 are joined by connecting brackets not shown.

Such an undercarriage bay 1 is formed from composite material, and is obtained by injection of resin, for example at low pressure, onto an overall preform, or rough, of the bay. By way of example, the preform, also termed textile preform, is a structure constituted by reinforcements, with carbon fibers linked by an epoxy powder and/or thermoplastic to give cohesion to the preform. The overall preform comprises two lateral preforms of which only one 103 is represented (FIG. 7), an upper preform 104, a preform, not shown, for each connecting bracket, preforms for upper stiffeners, not shown, and preforms for upper portions of the frame 105, which are assembled before the injection into a mold.

Each lateral preform 103 is provided to be impregnated with resin to form a composite lateral wall 3 and also to form the frame lateral portions 41 and the stiffeners 42 carried by the wall 3, after polymerization of the resin.

The upper preform is adapted to be impregnated with resin and to form the composite central wall 2 when the resin has polymerized.

The mold according to the invention in particular enables the correct assembly of the preforms in relation to each other and enables the support of that assembly before and during the injection of resin in an autoclave in which the mold is placed.

Figure 10:
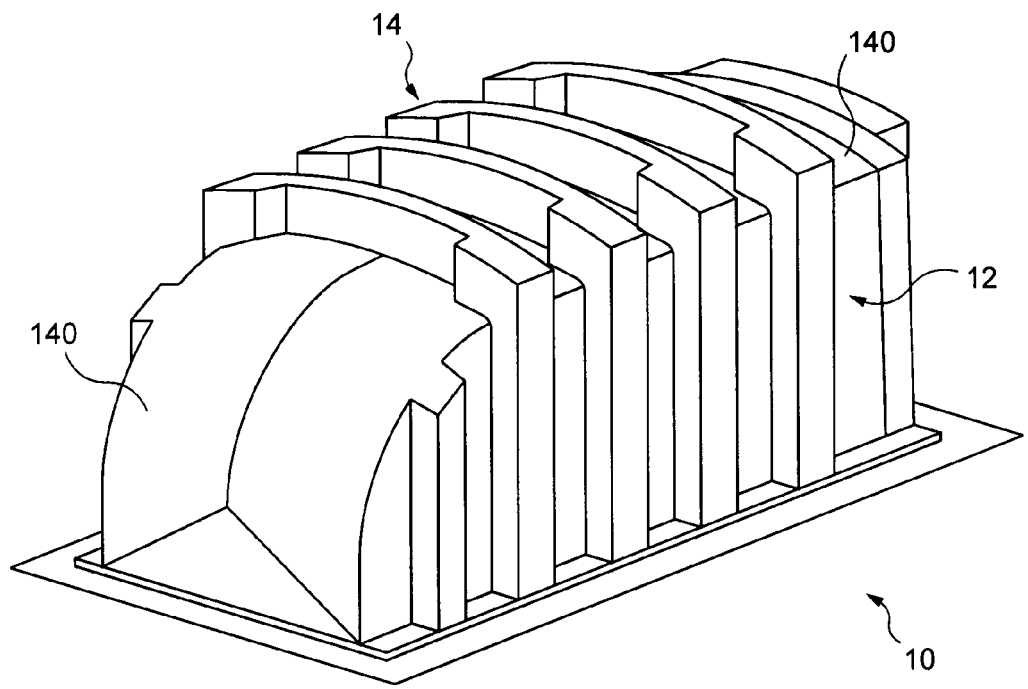
FIG. 10 is a representation of the assembled mold, with metal members covering the preforms of the central wall and of the frame portions.

As illustrated in particular in FIGS. 3 to 6 and 8 to 10, a mold 10 for manufacturing a part of this type comprises a central core 11, on which are mounted a first lateral mold member 12, a second lateral mold member 13 and an upper mold member 14 (visible in FIG. 10).

The central core 11 comprises a base 15 and a shell 16 having a shape substantially equivalent to that of the undercarriage bay 1.

The shell 16 has two lateral walls 17 which issue from the base 15 and an upper wall 18 transversely connecting the two lateral walls 17, remotely from the base 15

Each lateral wall 17 has a planar outside surface 19. As can be seen more easily in FIG. 4, the planar outside surfaces 19 are inclined to the vertical (the dashed line diagrammatically representing the inclination relative to the full line representing the vertical), while converging towards each other on moving away from the base 15.

The upper part of the lateral walls 17 comprises a cavity 20 (FIGS. 5 and 6) adapted, as explained later, to receive an edge 27 of the corresponding lateral mold member.

The upper wall 18 has an upper outside surface 21 and comprises three cavities 22 apparent on that outside surface 21 to enable the molding of the stiffeners 44 on the inside surface of the upper portion 5, as will be described later.

It will be noted that the cavities 20 and 22 stop axially at a specific distance from the back edge of the shell 16.

Reinforcing means 23 (FIGS. 4, 5 and 6) are provided inside the shell to reinforce the central core 11.

Figure 5:
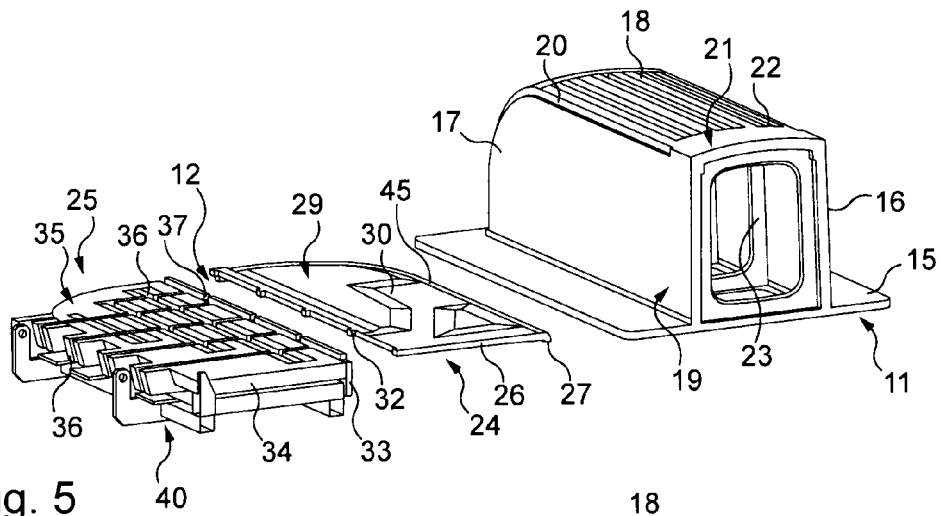
FIG. 5 is a representation of parts of the mold, including in particular a central core, an inside mold member and an outside mold member.
Figure 6:
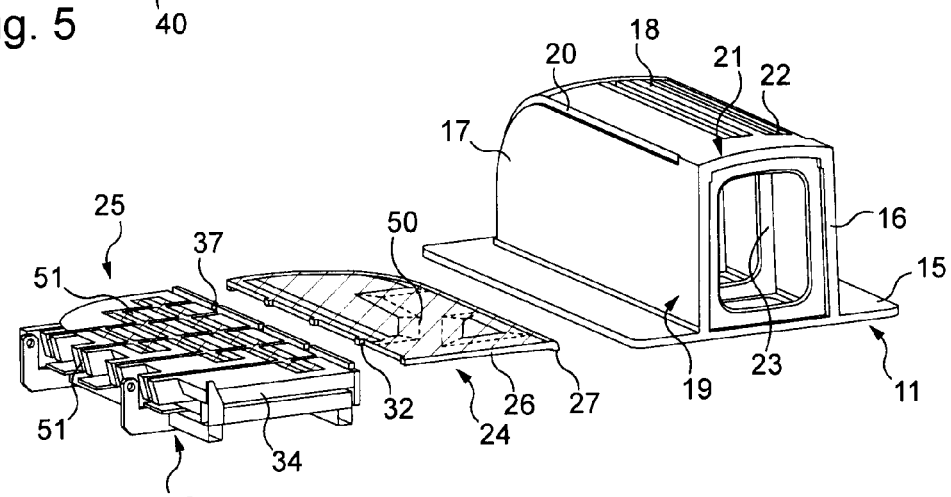
FIG. 6 is a representation similar to FIG. 5, with the inside and outside mold members supporting parts of the lateral preform.
Figure 7:
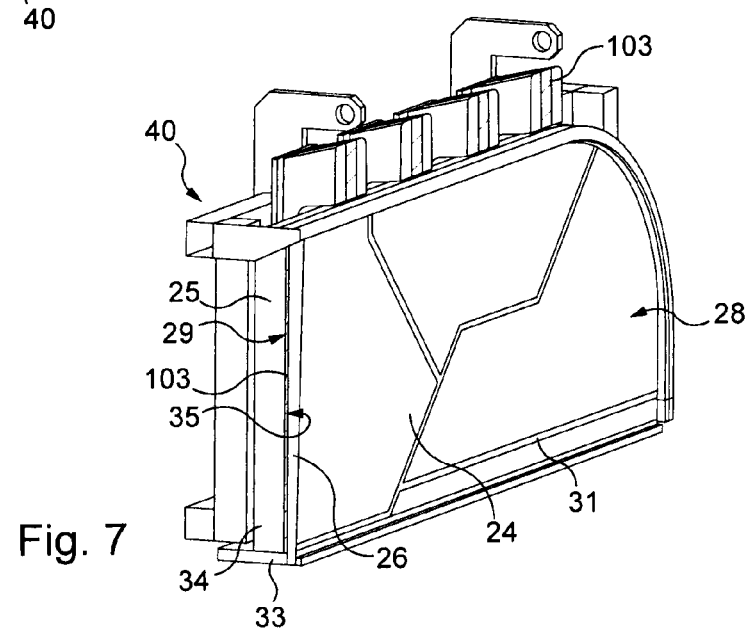
FIG. 7 is a perspective view of the handling means carrying the inside mold member and the outside mold member as represented in FIG. 6, when they are assembled, with the lateral preform between those two mold members.

The first lateral mold member 12 comprises an inside mold member 24 and an outside mold member 25, which are adapted to be hinged relative to each other (as can be seen in FIGS. 5 to 7).

The inside mold member 24 comprises a wall 26 which has a substantially planar inside surface 28 (FIG. 7) and an outside surface 29. The inside mold member 24 comprises a cavity 30 which is formed on the same side as the outside surface 29, and which is of similar shape and size to the shape and size of the region of increased thickness 70 of the inside surfaces of the lateral walls of the bay 1.

The outside surface 29 comprises on it upper part a cavity 45 adapted to receive a preform corresponding to the connecting brackets referred to earlier.

The inside surface 28 comprises on its upper part an edge 27 projecting transversely, which is adapted to be accommodated, as explained later, in the cavity 20 of the corresponding lateral wall 17.

The inside surface 28 comprises a resin supply network, formed by grooves 31 formed in the wall 26 and opening onto the inside surface 28 (FIG. 7). The flow of the resin is made possible when the inside surface 28 is mounted against the central core 11 and flow channels are thus formed between the inside surface 28 and the central core 11.

The two surfaces 28 and 29 are not parallel to each other, such that, as will be explained later, when the inside mold member 24 is positioned in the mold, the inside surface 28 forms an angle other than zero with the vertical while the outside surface 29 extends vertically.

Male hinge members 32 are disposed projecting from an edge of the inside mold member 24 (FIGS. 5 and 6).

The outside mold member 25 comprises a support plate 33 and a lateral wall 34. The lateral wall 34 has an inside surface 35 provided with cavities 36. The cavities 36 are of a number and have shapes corresponding to the number and to the shapes of the frame portions 41 and of the stiffeners 42 that it is desired to obtain after molding on the lateral wall 3. Here, as illustrated in FIG. 5, cavities 36 cross each other in the manner of a mesh on the inside surface 35 to reproduce the desired layout of the stiffeners 42 and of the frame lateral portions 41 on the undercarriage bay illustrated in FIG. 1. The fact that the cavities 36 are disposed on a surface of a single mold member makes it possible subsequently to obtain stiffener forming means (of the frame portions and of the stiffeners) on the same face of a wall of the undercarriage bay.

The support plate 33 and the lateral wall 34 are adapted to be disconnected from each other, in particular when mold extraction takes place as explained later.

The outside mold member 25 comprises female hinge members 37 adapted to receive the male members 32.

The two mold members 24 and 25 are hinged at the location of the support plate 33 and are adapted to pass from a flat position, in which they are at 180°, to an assembled position in which they are pressed against each other, the inside surface 35 being located facing the outside surface 29.

The outside surface 29 and the inside surface 35 are adapted to receive respectively a sub-preform 50 and 51 (FIG. 6), formed from at least one layer of material constituted by reinforcements, such that when the members 24 and 25 are assembled, the lateral preform 103, which is formed by uniting the sub-preforms 50 and 51, is clamped between the two members 24 and 25.

As will be explained later, such a mold design enables the sub-preform or sub-preforms 50 and 51 to be draped onto the mold member or members independently, laid flat, while having a vertical position ensured by the lateral preform 103 in the mold.

A description will now be made of the mold when it is assembled, before the injection of resin, with reference to FIGS. 3 to 10.

The first and second lateral mold members 12 and 13 form a mirror image of each other relative to the central core 11, such that from the central core 11 and towards the outside of the mold, there are successively encountered a lateral wall 17, an inside mold member 24 whose inside surface 28 is turned towards the lateral wall 17, a lateral preform 103 clamped between the outside surface 29 of an inside mold member 24 and the inside surface 35 of an outside mold member 25, and lastly the outside mold 25.

Furthermore, spacers connect substantially transversely together the inside mold members 24 of each lateral mold member, providing a stiffening function. A first spacer 38 is fastened behind the inside mold members 24, in their upper corner, and a second spacer 39 (FIG. 3) is fastened at the front of the inside mold members 24, in the bottom portion.

Figure 8:
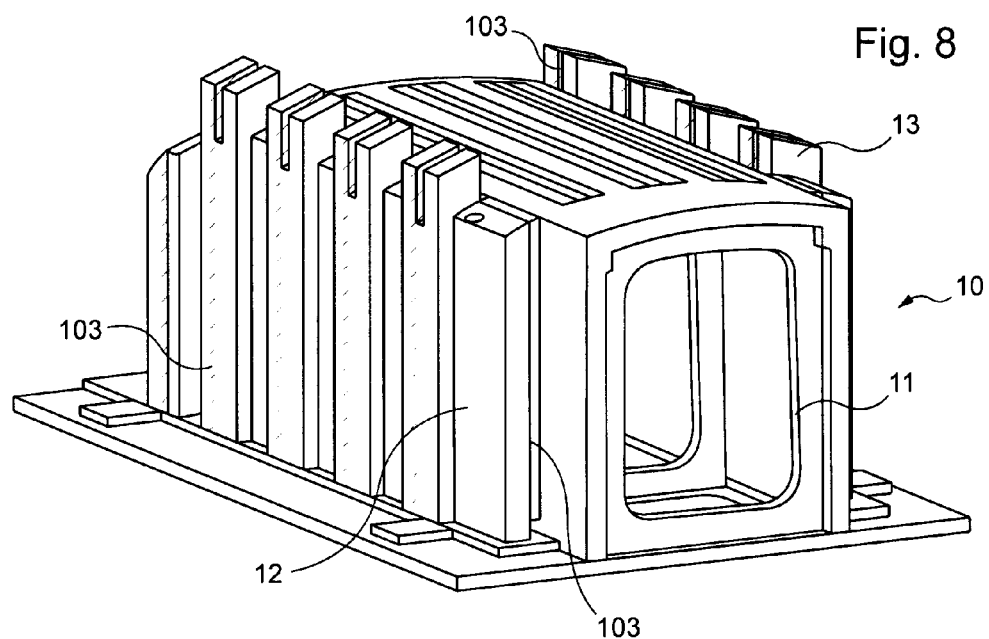
FIG. 8 is a representation of the mold in course of assembly, with the central core and the lateral mold members assembled.
Figure 9:
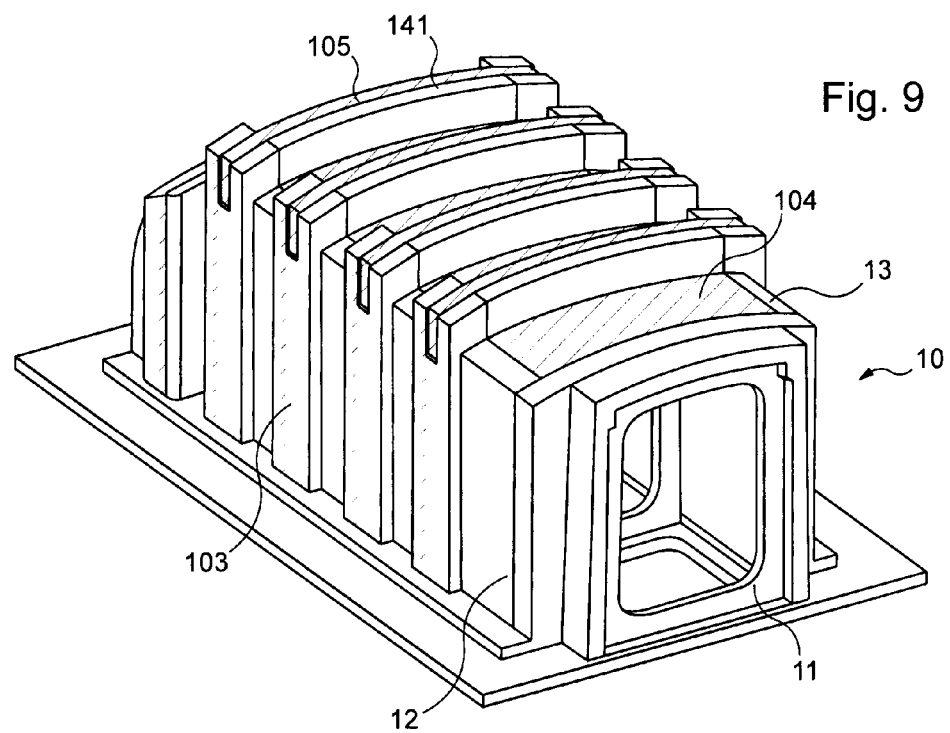
FIG. 9 is a representation of the mold in course of assembly, with the preform of the central wall and the upper mold member assembled on the central core.

An upper preform 104 (visible in FIG. 9) of the central wall 2, is disposed on the upper outside surface 21 of the upper wall 18, with a preform for the upper stiffeners 44 being disposed in the cavities 22 (visible in FIG. 8).

An upper mold member 14 comprises metal plates 140 (visible in FIG. 10) which are adapted to cover the upper preform 104, and transverse portions 141 disposed above the upper preform 104 and which are adapted to receive a preform 105 (visible in FIG. 9) corresponding to the frame upper portions 43. The upper preform 104 corresponding to the central wall is clamped between the central core 11 and the upper mold member 14. It is observed here that the preform for the upper stiffeners 44 is disposed remotely from the preform 105 for the frame upper portions 43 relative to the upper preform 104 for the central wall 2.

The upper mold member 14 transversely joins the lateral preforms 103, with the preform 105 disposed as to extend from and in alignment with the upper ends of the lateral preforms.

A description will now be made of the use of such a mold with reference to FIGS. 5 to 7 for the manufacturing of a composite part such as an aircraft undercarriage bay.

The inside mold member 24 and the outside mold member 25 are for example laid out flat. The inside mold member 24 is disposed such that the outside surface 29 is oriented upwardly, while the outside mold member 25 is disposed such that the inside surface 35 is oriented upwardly (FIG. 5).

It should be noted that laying flat is not imperative. To facilitate the draping of the material (depositing of a layer or layers) the mold member must not however be close to the vertical. An inclination that would be liable to induce natural slippage of the layer of material on the mold member must therefore be avoided. This inclination depends in particular on the coefficient of friction between the material of the layer and that of the mold.

Thus, for the coefficient of friction of carbon on steel (low coefficient of the order of 0.10 to 0.15), the inclination is for example from 6 to 9°.

At least one layer of material is deposited, here several layers, forming a sub-preform 50 on the outside surface 29 (the layers of material are represented grayed in FIGS. 6 to 9 to facilitate understanding). The layers of material espouse the shape of the outside surface 29 and in particular of the cavity 30 corresponding to the region of increased thickness of the lateral wall 3, such that a portion of the layers of material is set back relative to the plane in which said layers mainly extend.

Deposition is also carried out of layers of material forming a sub-preform 51 on the inside surface 35. This sub-preform 51 will be accommodated in the cavities 36 on the inside surface 35 and will correspond to the stiffeners 42 and to the frame portions 41 in the undercarriage bay to be obtained.

As was described earlier, the cavities 36 here form a mesh. The deposit of the layers of material takes place here in two different directions with a first deposit in each cavity which extends in a given direction, then a second deposit in each cavity which extends in a different direction.

It is to be noted that the deposit of the sub-preforms 50 and 51 is made simple here by the laid flat position of the two mold members 24 and 25 when that deposit is made.

The male hinge members 32 and the female hinge members 37 are associated in such a manner as to assemble the two mold members 24 and 25, then they are folded against each other, thereby forming the first lateral mold member 12. The outside surface 29 and the inside surface 35 are turned towards each other, and the lateral preform 103 formed by uniting the sub-preforms 50 and 51 is clamped between the mold members 24 and 25.

This assembly facilitates the handling of the members thus assembled.

The first lateral mold member 12 and the associated lateral preform 103 are then moved towards the central core 11. As illustrated in FIGS. 5 to 7, handling tooling 40 is used for moving the lateral mold member 12. This tooling carries the outside mold member 25 even before the operation of depositing the layer of material, thereby facilitating the setting to the vertical of the lateral mold member 12 when the inside and outside mold members have been assembled.

Similar operations are carried out to form the second lateral mold member 13 and to move it towards the central core 11.

Each of the lateral mold members 12 and 13 is disposed on opposite sides of the central core 11, by bringing, for the lateral mold member 12, the inside surface 28 against the outside surface 19 of the core, and by proceeding in the same way for the lateral mold member 13. The projecting edge 27 of the internal mold members is accommodated in the cavity 20 formed in the lateral wall 17.

The internal mold members of each lateral mold member are connected substantially transversely by the spacers 38 and 39.

The upper mold member 14 is disposed facing the outside surface 21 of the upper wall 18, while the latter was covered beforehand with at least one layer of material forming the textile preform 104. The upper mold member 14 is adapted, as described earlier, to clamp the upper preform 104 with the central core 11 and ensure the placing in position of the preforms corresponding to the upper portions of the frame 43.

Each lateral preform 103 is then reliably indexed in relation to the central core and the upper textile preform 104 is disposed directly on the central core 11. Furthermore, each preform is held in position by the mold members that clamp it, and no subsiding of the preform is therefore to be feared when the resin is injected.

The mold is closed, covered with a vacuum bag in which a vacuum is formed and is placed like this in an autoclave.

The injection of resin is then carried out. The resin spreads in particular between the central core 11 and the inside mold member 24 by the flow channels formed by the grooves 31 and the outside surface 19 (FIG. 7).

The inside mold member of the symmetrical lateral mold member 13 comprises a similar resin supply network, such that the resin spreads all around the central core 11.

The injection of resin, then the polymerization, enable the preforms to be mechanically connected and to obtain an undercarriage bay It should be noted that during injection the support 40 is withdrawn and the plate 33 is kept in position.

After a specific time, sufficient for the resin to be polymerized, the mold may be opened and the composite part removed.

Removing the part from the mold will now be described.

In a first phase, for each of the lateral mold members 12 and 13, the lateral wall 34 of the outside mold member 25 is removed, the lateral wall 34 being for that purpose disconnected from the support plate 33. The lateral wall 34 is removed while the support plate 33 remains in position, hinged to the inside mold member 24.

The upper mold member 14 (visible in FIG. 10) is also removed.

Figure 3:
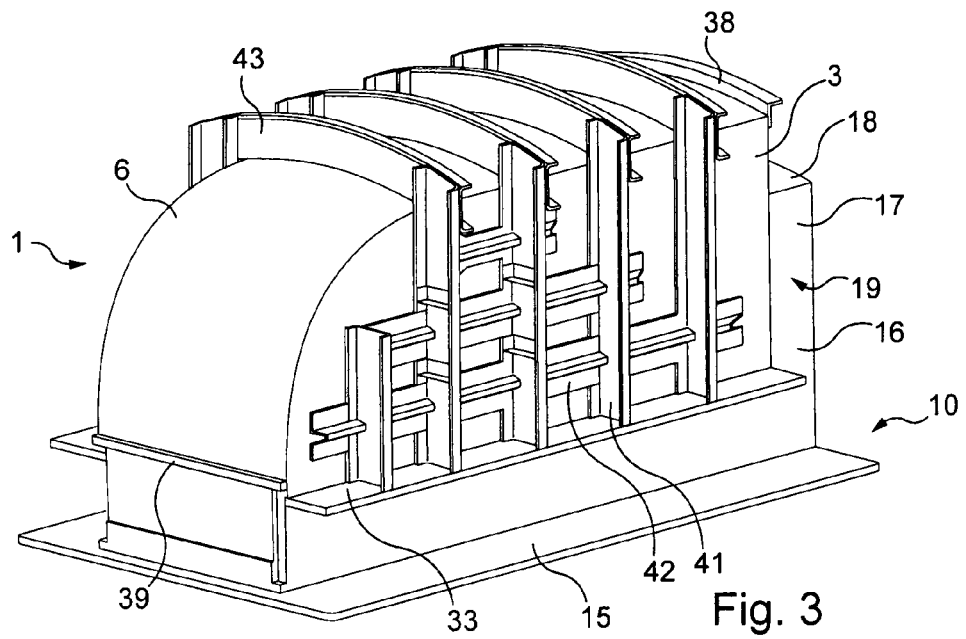
FIG. 3 is a perspective view of the undercarriage bay of FIG. 1 and of a part of the mold, the undercarriage bay being in course of removal from the mold.

As illustrated in FIGS. 3 and 4, the assembly formed by the inside mold members 24, the plate 33 of the outside mold members 25 and the spacers 38 and 39 is then moved away from the central core 11. Rings (FIG. 3) are provided on the plates 33 to anchor the slings for mold extraction and to raise the assembly away from the central core 11. The draft angles of the surfaces 19 and 28 thus enable easy removal from the mold.

When the part and the remaining mold members have been put down again, the spacers 38 and 39 should be removed, then the inside mold members 24. The part is thus removed from the mold.

If the part to mold does not have a region of increased thickness on the inside, the constitution of the mold with a core 11 and an inside mold member 24 is not necessary since removal from the mold is possible. If the part to mold comprises local regions of increased thickness on the inside then the inclined walls are necessary (in order to have a draft angle). The removal from the mold is rendered possible thanks to the use of a core 11, an inside mold member 24 and the draft angle.

In variants not represented, the number and the shape of the stiffeners and of the frame portions may vary such that the arrangement of the associated preforms in the mold varies; for example, it may be that only stiffeners are disposed on the lateral walls while only frame portions are disposed on the central wall, with the stiffeners and the frame portions extending in two different directions; or else, for example, the central wall may have stiffeners and upper frame portions on the same outside surface 5' of the upper portion 5, with in this case a different shape of the upper mold member to dispose the preform of the upper stiffeners and the preform for the upper frame portions of the same side of the upper preform.

In another variant not represented, only one of the mold members is draped, the function of the other mold member merely being to clamp the lateral preform.

In other variants not represented, the shape of the regions of increased thickness may vary; it is possible for one and/or the other of the lateral walls not to have any region of increased thickness on their inside surface; the central wall may also have no region of increased thickness on its inside surface.

Numerous other variants are possible according to circumstances, and in this connection it is to be noted that the invention is not limited to the examples described and shown.

The invention claimed is:

1. A mold adapted to receive a preform for a part of composite material and in which the preform is adapted to be impregnated by injection of resin to form the part of composite material and comprises at least one substantially vertical lateral preform, the mold comprising:
    a central core comprising at least one lateral wall which has a flat outside surface;
    an inside mold member having an inside surface turned towards the outside surface of the central core, with the surfaces being inclined relative to the vertical to form a draft angle, the inside mold member also having a substantially vertical outside surface; and
    an outside mold member mounted against the inside mold member and which has a substantially vertical inside surface, such that the inside surface of the outside mold member is turned towards the outside surface of the inside mold member;
    wherein the inside surface of the outside mold member or a facing outside surface of the inside mold member being adapted to receive the lateral preform, such that the inside mold member and the outside mold member are adapted to clamp the lateral preform;
    wherein the inside surface, inclined relative to the vertical, of the inside mold member bears grooves adapted to form, with the outside surface of the at least one lateral wall of the central core, flow channels for the resin, when the inside mold member is disposed against the outside surface of the at least one lateral wall of the central core.

2. The mold according to claim 1, wherein the outside surface of the inside mold member is adapted to receive a layer of material to form a sub-preform of the lateral preform.

3. The mold according to claim 2, wherein a cavity is formed in the outside surface of the inside mold member, such that the sub-preform is adapted to cover the cavity.

4. The mold according to claim 2, wherein the inside surface of the outside mold member is adapted to receive a layer of material to form a second sub-preform of the lateral preform.

5. The mold according to claim 4, wherein the inside mold member and the outside mold member are adapted to clamp the two sub-preforms, the uniting of which forms the lateral preform when the mold members are mounted against each other.

* * * * *